United States Patent

Waite et al.

[15] 3,648,734
[45] Mar. 14, 1972

[54] PIPE COVER SPACER AND DIAMETER COMPENSATOR

[72] Inventors: William Waite; Victor Skuran, both of Chicago, Ill.

[73] Assignee: Transco Inc., Chicago, Ill.

[22] Filed: May 25, 1970

[21] Appl. No.: 40,102

[52] U.S. Cl. .............................. 138/113, 138/114, 138/148, 285/138
[51] Int. Cl. ......................................................... F16l 9/18
[58] Field of Search ................... 138/113, 114, 147, 148, 149; 285/47, 138, 139, 140, 141

[56] References Cited

UNITED STATES PATENTS

| | | | |
|---|---|---|---|
| 3,288,497 | 11/1966 | Nydam | 285/138 |
| 363,663 | 5/1887 | McKinney | 138/147 X |
| 2,056,840 | 10/1936 | Callorn | 138/113 |
| 2,763,321 | 9/1956 | Schuster | 138/148 X |
| 2,347,855 | 5/1944 | Varga | 138/149 X |
| 2,088,400 | 7/1937 | Black | 138/147 |
| 1,972,508 | 9/1934 | Zeiner | 138/147 |

Primary Examiner—Herbert F. Ross
Attorney—Edward C. Threedy

[57] ABSTRACT

A pipe cover spacer and diameter compensator in the form of an elongated curved bendable ribbonlike strip having a relatively flat skirt portion abutting and secured to the inside surface of the pipe cover and inwardly radially extending fingers terminating into relatively flat bendable tabs angularly extending from the fingers to yieldably bear against the surface of the pipe to resist lateral movement between the cover and the pipe and to compensate for any variation in the space between the cover and the pipe.

2 Claims, 5 Drawing Figures

PATENTED MAR 14 1972  3,648,734

INVENTORS.
WILLIAM WAITE &
VICTOR SKURAN
BY Edward C. Kheedy
THEIR ATTORNEY.

PIPE COVER SPACER AND DIAMETER COMPENSATOR

SUMMARY OF INVENTION

Our invention is intended for use in connection with a pipe covering in which the covering is formed of semicircular complementary elongated metal sections arranged to embrace the pipe to be covered thereby, with their abutting longitudinal edge portions in overlapping relation and secured together in pipe covering position by suitable securing means, such as metal screws, spot welding, or the like.

Such cover is larger than the diameter of the pipe to provide a space therebetween. Such space results from the fact that the pipe covered thereby is generally in sections with the abutting ends of the pipe provided with flanges for securing the pipes together, or secured together by welding. As a result of these flanges or weld joints, the cover on opposite sides of such flanges or welds in the direction of the length of the pipe is spaced, resulting in the creation of an annoying vibration of the cover whenever the contents, such as liquid or the like, is passed through the pipe, especially under pressure.

The object of our invention is to provide a spacer for the cover and to compensate for variation in diameter of the pipe which results by virtue of the flanges or the weld joints aforesaid.

We propose to accomplish this object by a pipe cover spacer and diameter compensator of the preferred form of construction shown in the accompanying drawings, in which.

Figure 1:
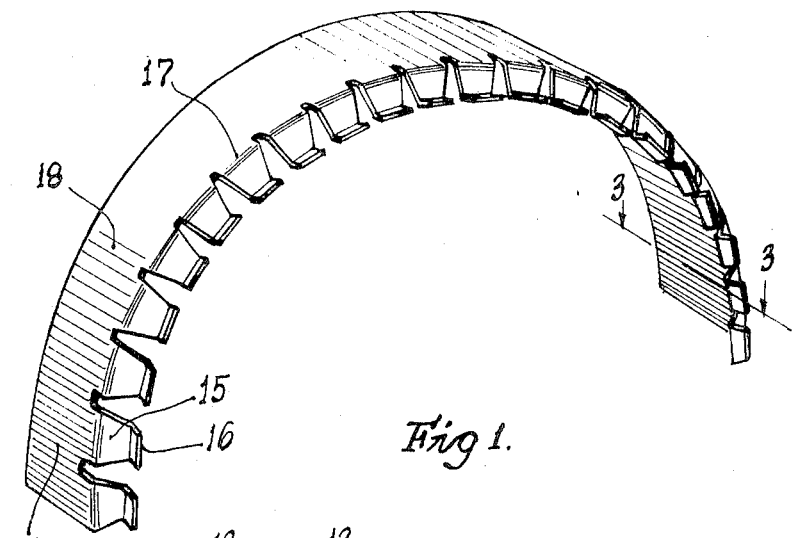
FIG. 1 is a perspective view of one section of a cover spacer.
Figure 5:
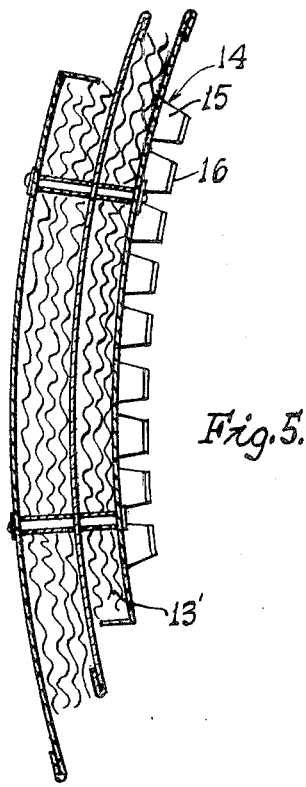
FIG. 5 is a sectional detail view taken substantially on line 4—4 of FIG. 3.
Figure 2:
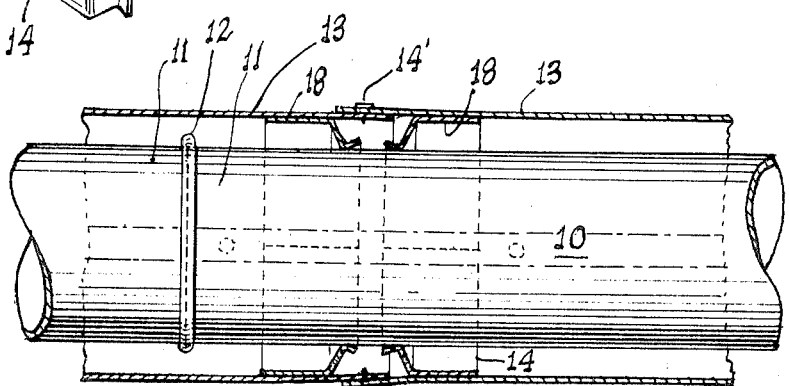
FIG. 2 is a sectional detail view of a cover and the spacer therefor embracing a pipe.
Figure 3:
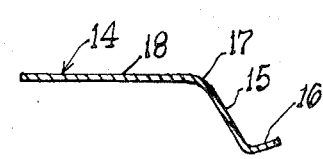
FIG. 3 is a sectional detail view taken substantially on line 3—3 of FIG. 1.

Referring more particularly to FIGS. 1 to 3 inclusive, the pipe to be covered is indicated at 10, and the cover therefor at 13. The cover 13 comprises elongated lengths each formed of complementary elongated sections semicircular in cross section, the lengths having their opposite end portions in overlapping relation and secured together by any suitable means such as by metal screws 14′ or the like.

In this form of construction, the ends 11 of the lengths of pipe are welded together as at 12. Through this pipe may pass a liquid or other material. When such liquid or other material flows through the pipe, either under its normal pressure or is forced or pumped therethrough, a vibration is often set up which would be transmitted to the cover 13 were the cover 13 in contact with the pipe 10. The weld 12, being of a larger outside diameter than that of the outer surface of the pipe 10, does not permit the cover 13 to have tight surface contact with the pipe, with the result that vibration of the pipe is transmitted to the cover, creating a vibratory noise or the like.

To prevent this and to compensate for variation in diameter of the pipe resulting from the weld joint, we provide a spacer which is generally indicated at 14.

The spacer 14 is formed in semicircular elongated strips of suitable bendable metal. Extending from one edge of the strip 14 radially from the strip and at an angle with respect thereto are a plurality of bendable fingers 15. The ends of these fingers 15 terminate into angularly disposed tabs 16 which are designed to engage the adjacent surface of the pipe 10 as shown in FIG. 1. These fingers 15 are provided by serrating the edge 17 of the strip 14. The flat skirt portion 18 of the strip may be attached within the cover 13 by welding or the like. However, any other form of attaching means may be provided.

In the present instance, we have shown in FIG. 2, adjacent the end of the adjacent abutting ends of the cover 13, adjacent spacers 14. Inasmuch as the cover lengths are placed about the pipe 10 in longitudinal semicircular sections, the spacers 14 are attached to the cover sections prior to their installation about the pipe 10. Should it be found in such assembly that the fingers 15 do not properly contact or bear against the surface of the pipe 10, they may be individually bent inwardly until they properly come into contact with the surface of the pipe and, being of spring material, they will function to hold the cover sections 13 from rattling due to vibration of the pipe 10. These spacers 14 provide a space between the cover 13 and the pipe 10 and therefore provide an airspace, thus reducing corrosion to a minimum.

Should the cover 13 be formed of reflective material, the surface of the cover will act as a reflector, thereby insulating the pipe.

Figure 4:
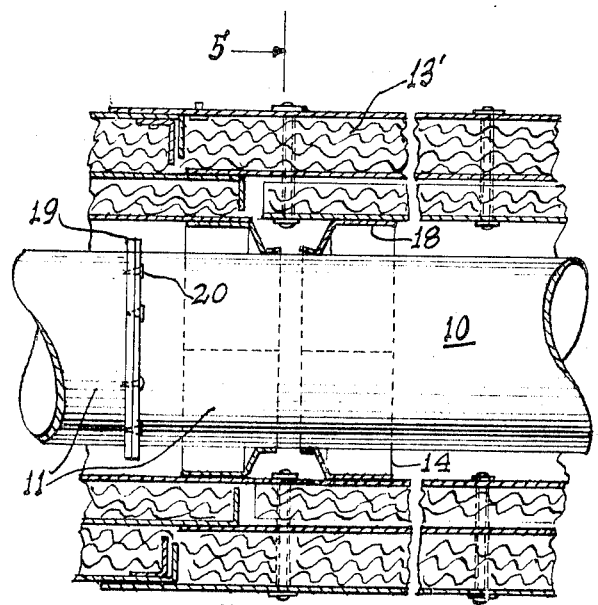
FIG. 4 is a sectional detail view similar to FIG. 2, but showing a modified form of construction, the cover being of an insulated construction.

In FIG. 4, we have illustrated the pipe sections 10 as being connected together by abutting flanges 19, which flanges may be secured together by suitable connecting means 20 in the form of bolts or spot welding as required. In this case the cover 13′ is in the form of the insulated wall or panel sections shown in U.S. Pat. No. 3,412,518 granted Nov. 26, 1966. In this form of construction, the spacer 14 is connected to the inside of the insulated panel. The construction is otherwise the same as that shown in FIGS. 1 to 3 inclusive.

In either form of construction, whenever a variation is found between the outside diameter of the pipe and the inside diameter of the cover, the fingers 15 may be bent to engage the pipe 10 and thus compensate for any diameter variation thereof. In such adjusted position of the fingers 15, the tabs 16 will yieldably bear against the surface of the pipe 10. These tabs 16 serve the additional function of preventing the ends of the fingers 15 from cutting into the pipe, which eventually might result in a line of weakened union, thus rupturing or otherwise damaging the pipe.

The form of construction shown in the drawing is factory-assembled and thus requires no cutting or fitting of the parts on the job. Any number of spacers 14 may be used, according to the length of the pipe. Bending of the tabs 16 may be accomplished by any suitable tool.

If desired and if required, the cover and its spacer may be held tightly against the pipe by means of suitable straps or the like which encircle the pipe cover. Such straps do not form any part of this invention.

While we have illustrated and described the preferred form of construction for carrying our invention into effect, this is capable of variation and modification without departing from the spirit of the invention. We, therefore, do not wish to be limited to the precise details of construction set forth, but desire to avail ourselves of such variations and modifications as come within the scope of the appended claims.

Having thus described our invention, what we claim as new and desire to protect by Letters Patent is:

1. An improvement in a pipe cover spacer and diameter compensator comprising
   a. a substantially elongated metallic strip arcuated throughout its length into a semicircular form,
   b. said strip providing a smooth surfaced skirt portion adapted to be fixedly secured to the inner surface of the pipe cover,
   c. a plurality of equidistant angularly disposed yieldable fingers formed on one edge portion of said skirt and extending in a direction away from and inwardly of the arcuated plane of said skirt,
   d. and pipe-engaging tabs carried by the free ends of each of said fingers and angularly disposed with respect thereto so as to lie in a predetermined arc, with said fingers and said tabs yieldable with respect to each other and to said skirt to accommodate a peripheral sector of the pipe to be covered.

2. The improvement in a pipe cover spacer and diameter compensator of claim 1 further defined by said fingers being obtusely angled with respect to said skirt and with said tabs being of a length less than said fingers and substantially at right angles with respect thereto.

* * * * *